UNITED STATES PATENT OFFICE.

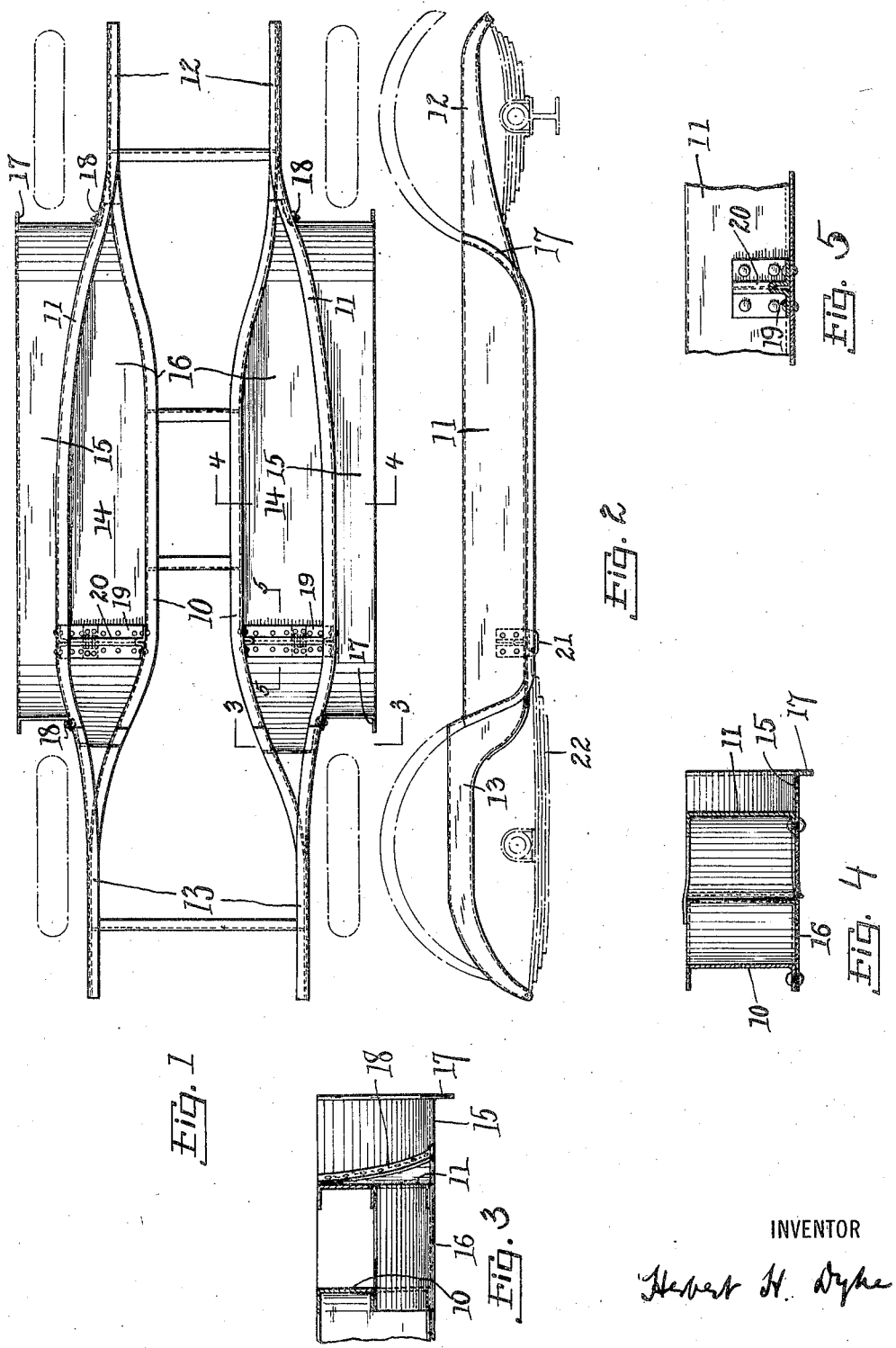
H. H. DYKE.
AUTOMOBILE CHASSIS FRAME.
APPLICATION FILED JUNE 10, 1918.
1,290,939.
Patented Jan. 14, 1919.
4 SHEETS—SHEET 1.
INVENTOR
Herbert H. Dyke

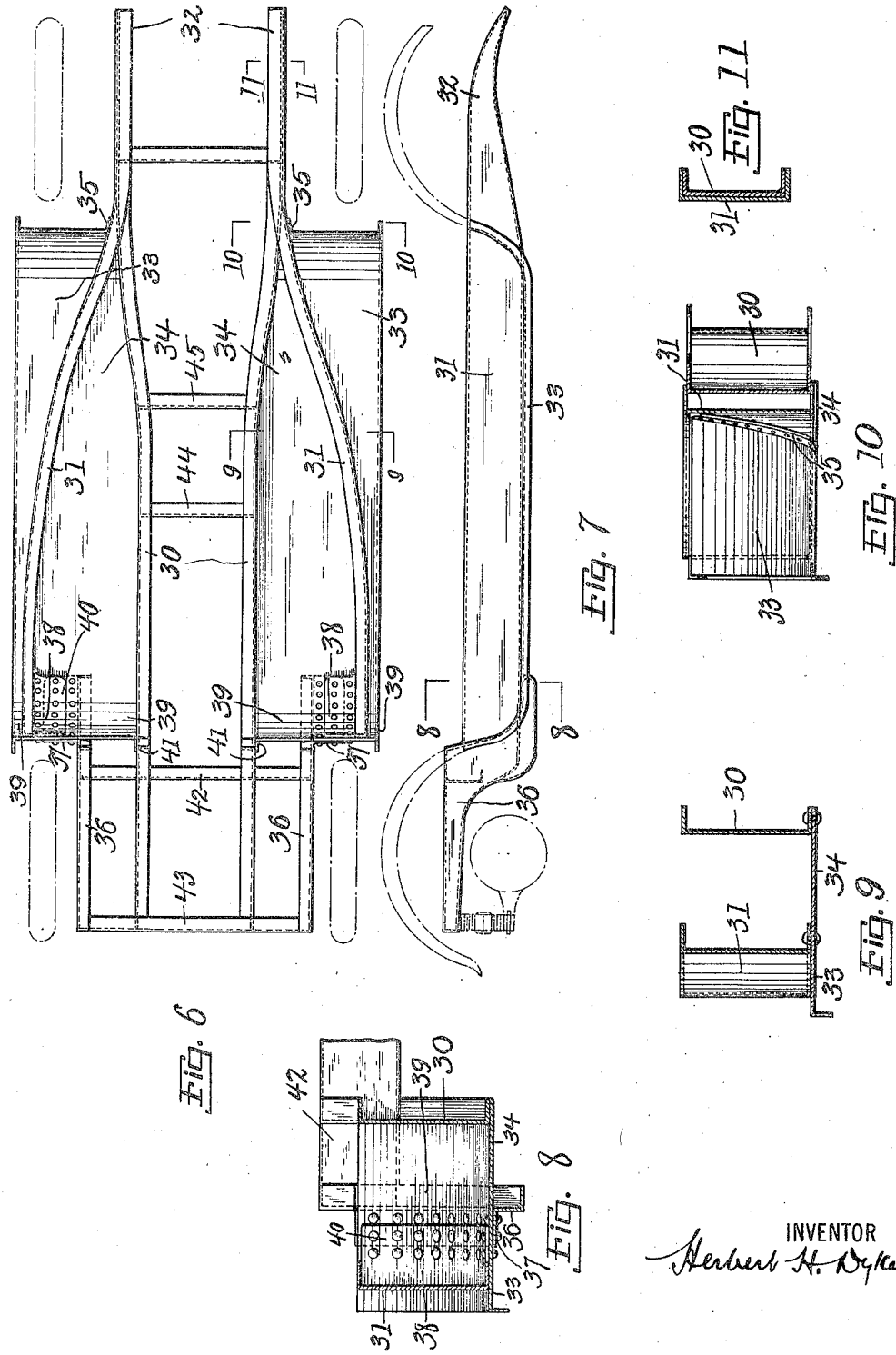

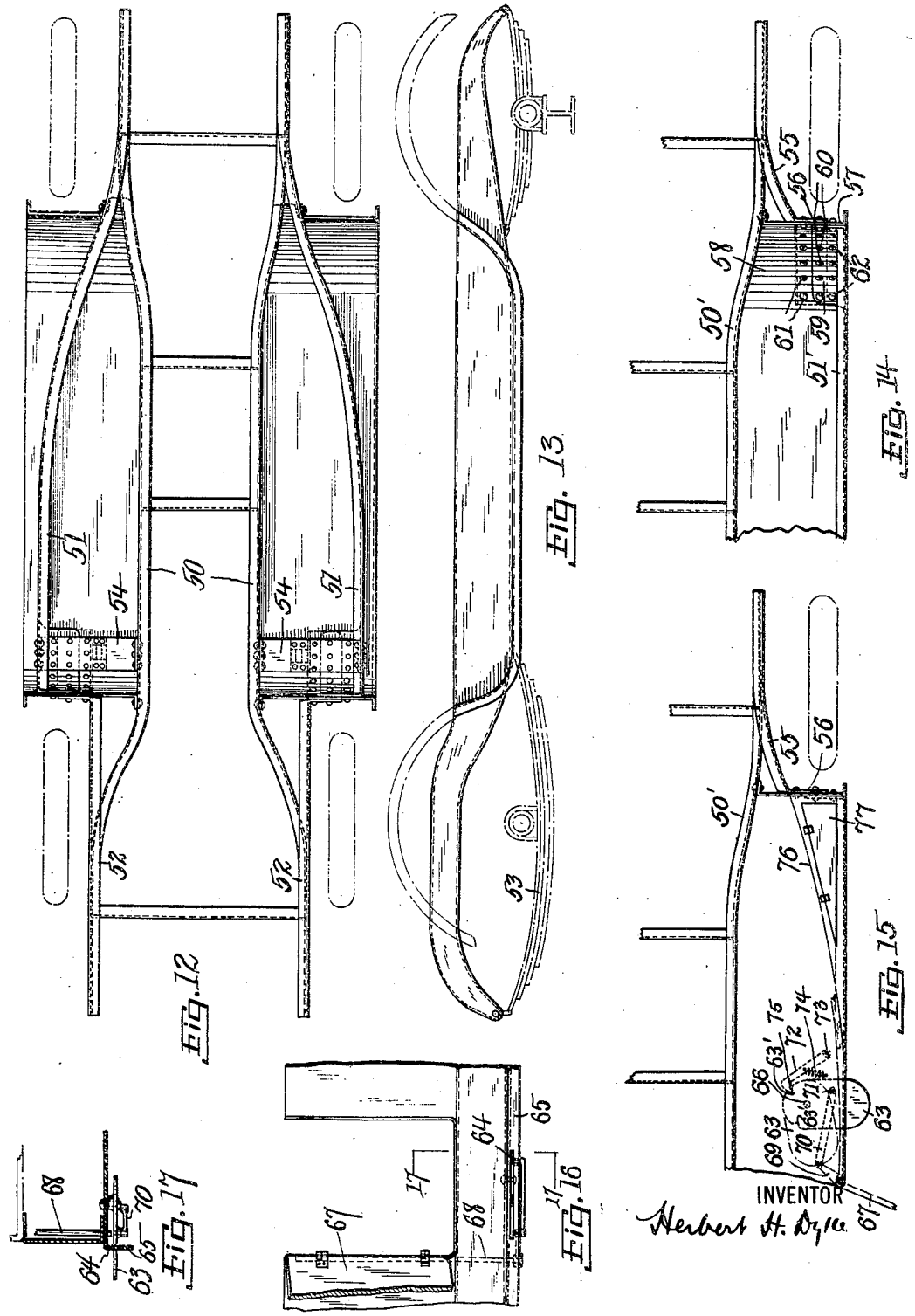

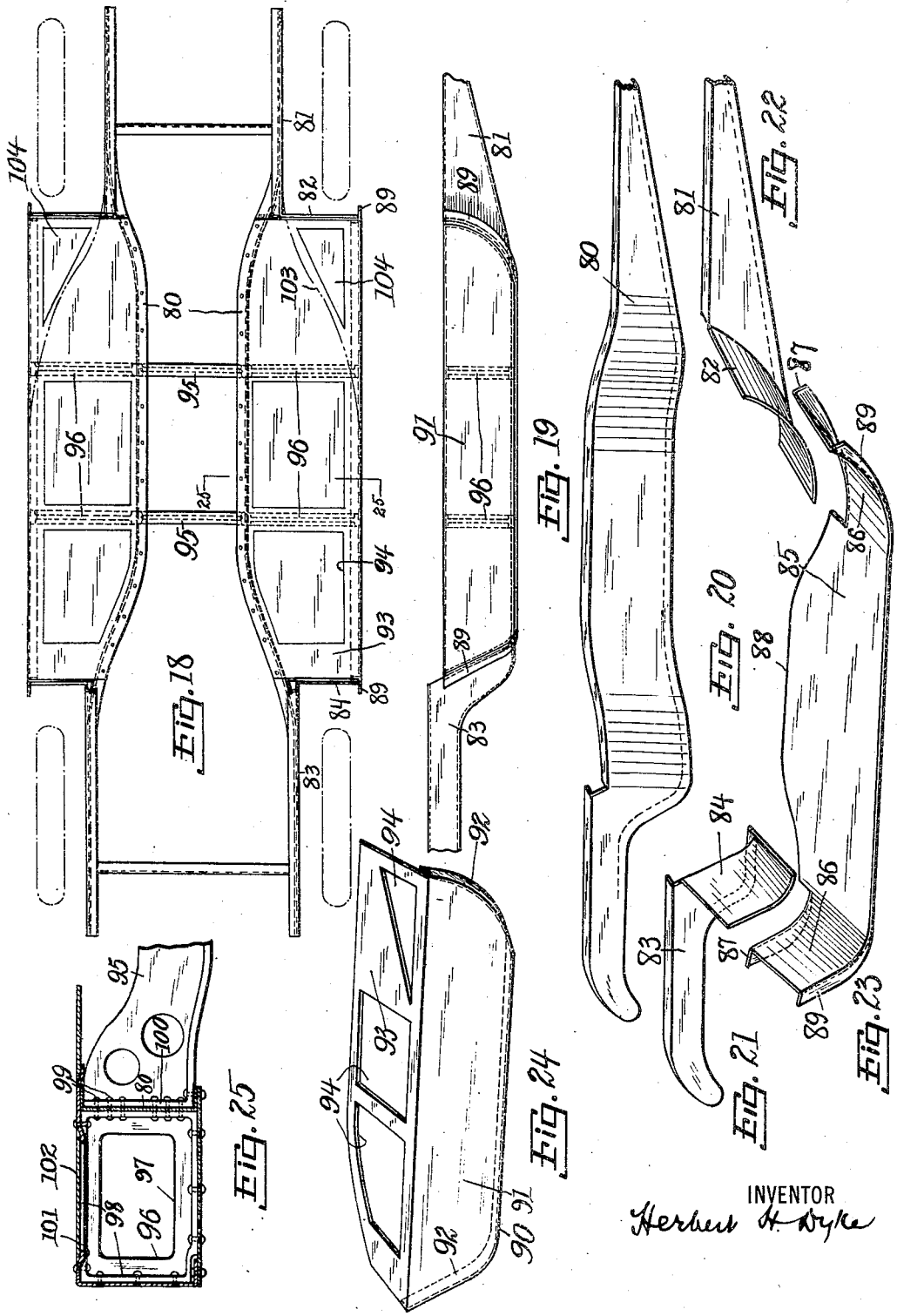

HERBERT H. DYKE, OF MONTCLAIR, NEW JERSEY.

AUTOMOBILE CHASSIS-FRAME.

1,290,939.  Specification of Letters Patent.  Patented Jan. 14, 1919.

Application filed June 10, 1918. Serial No. 239,095.

*To all whom it may concern:*

Be it known that I, HERBERT H. DYKE, a citizen of the United States, and a resident of Montclair, county of Essex, and State of New Jersey, have invented certain new and useful Improvements in Automobile Chassis-Frames, of which the following is a specification.

The object of the present invention is to provide an automobile chassis frame of improved and strengthened construction, in which space hitherto either wasted or but partially utilized is inclosed or adapted to be inclosed and made available for storage purposes. The invention further relates to improvement of chassis frames for automobiles in a number of important respects, and with the foregoing and related objects in view, my invention consists in the parts, improvements and combinations herein set forth and claimed.

In the accompanying drawings I have shown a number of ways in which my invention can be applied to the improvement of automobile frames, but it is to be understood that the same are for affording a clear understanding of the invention only and not for limitation. In the said drawings, forming a part of this specification, Figure 1 is a plan view and Fig. 2 a side view of one form of automobile chassis frame. Figs. 3, 4 and 5 are cross-sectional detail views of the frame shown in Figs. 1 and 2, and taken, respectively, on the lines 3—3, 4—4 and 5—5, Fig. 1. Figs. 6 and 7 are plan and side views of a modified form of frame. Fig. 8 is a cross-sectional view taken on the line 8—8, Fig. 7, and Figs. 9, 10 and 11 are cross-sectional views taken on the lines 9—9, 10—10 and 11, 11 of Fig. 6. Figs. 12 and 13 are plan and side views of another modified form of frame. Fig. 14 is a fragmentary plan view of a frame similar to that shown in Fig. 12, but with certain changes. Fig. 15 is a fragmentary plan view of a frame similar to that shown in Fig. 14, but with the addition of a movable step operated from the door. Fig. 16 is a side view showing an arrangement whereby a step may be operated from the door, and Fig. 17 is a cross-sectional view on the line 17—17, Fig. 16. Figs. 18 and 19 are, respectively, plan and side views of another modified form of frame. Figs. 20, 21, 22 and 23 are perspective views of frame members of the frame shown in Figs. 18 and 19 prior to assembly. Fig. 24 is a perspective view of another portion of the frame of Figs. 18 and 19, and Fig. 25 is a cross-sectional view taken substantially on the line 25—25, Fig. 18.

Referring to the form of frame shown in Figs. 1 and 2, reference characters 10, 10 are applied to internal longitudinally arranged frame members, and 11, 11 to external frame members, preferably formed of thin sheet metal, such as steel, and preferably having the form of U-bars, as appears in the cross-sectional Figs. 3 and 4. These frame members are brought together in the manner shown in Fig. 11 at their forward ends to form reinforced horns 12, 12, and are brought together in the same way at their rearward ends to form reinforced rearwardly projecting horns 13, 13. Between their ends the frame members 10 and 11 are separated preferably about as shown in Fig. 1, leaving intermediate spaces 14, 14, and such spaces are inclosed at the bottom by inward extensions of the running board members 15, 15, such extensions being designated at 16, 16. Said running board members may also be stamped from metal, such as thin steel, and may have marginal flanges 17, 17 for imparting strength thereto at their outer edges, and may also be provided at their upwardly curved end portions outside the frame members 11 with flanges 18, 18 which may be riveted to the exterior frame members 11, 11. The extensions 16, 16 of the running boards 15 preferably pass beneath the frame members 10 and 11 and are secured as by rivets to the lower web thereof.

The frame illustrated in Figs. 1 and 2 is provided at its rear end with horns 13 adapted for the attachment of semi-elliptic rear springs, and cross members 19 are provided preferably stamped from sheet metal with a strengthening rib 20 and suitably riveted to the frame members 10 and 11 and to the bottom members 16, 16, so as to afford a suitably strengthened and reinforced attachment as at 21 for the forward ends of the rear springs illustrated at 22.

It will be seen that with a frame constructed in the manner illustrated in Figs. 1 and 2, while there is more or less narrowing of the running board members 15, 15 as compared with usual practice, there is nevertheless sufficient width of these members to provide for their use as a step in entering or leaving the car. A considerable saving of space is effected, as indicated at 14, to be used for storage, and suitable provision may be made for access thereto, as by trap doors in the floor of the car body, etc.

The frame illustrated in Figs. 6 and 7 is adapted for the use of a transversely arranged rear spring member, and the inner frame members 30, 30 may extend substantially straight back to the rear end of the frame, or may approach one another substantially as shown. These inner frame members 30, 30 and the outer frame members 31, 31 are brought together at their forward ends, as shown in Fig. 11, to provide forwardly projecting frame horns 32, 32, and the running board members 33, 33 and the extensions 34, 34 thereof extend beneath the channel frame members 30 and 31 and are riveted thereto, as shown in Fig. 9. At their forward ends the running board members have flanges 35, 35 formed on the upwardly projecting curved portions thereof and are secured, as by rivets, to the frame members. At the rear end of the frame two frame members 36, 36 are arranged longitudinally on each side of the frame to complete the frame of the desired width, and provision is made for connecting the outer frame members 31, 31 and such members 36, 36 together so as to form a substantially stiff girder-like construction, and the upwardly curved rear end portion of the running board members 33, 33 is preferably utilized to give added stiffness and strength of connection between the members 36, 36 and the members 31, 31.

In the form shown, the members 36, 36 are provided with laterally projecting curved flanges 37, 37 which project outwardly, and the members 31, 31 are provided with inwardly projecting flanges 38, 38, both the flanges 37 and 38 being curved to conform to the curve of the rear end portions 39, 39 of the running boards 33 and extensions 34, 34. The flanges 37, 37 are outside of or behind the members 39, 39, while the flanges 38, 38 are inside of or in front of said curved portions 39, 39, and the flanges 37 and 38 are preferably sufficiently long to overlap to some extent, as illustrated at 40, and in this region they are preferably secured together, as by riveting or the like, the same being through a three-thickness structure composed of flanges 38, 38 and the intermediate curved running board member 39, thus giving a very strong and rigid connection between the members 31 and 36, so that the same are adapted to resist strain substantially as well as if made from one-thickness piece. Each of the members 37 and 38 may also be riveted separately to the running board members 39, if desired, and in the form shown such connection is made by means of rivets. The members 34, 34 are preferably connected at the rear ends thereof to the frame members 30, 30 by flanges 41, 41, thereby adding to the strength and stiffness of the structure, and the frame members 31, 31 and 36, 36 may be suitably connected by suitable cross members extending from outside to outside of the frame, as illustrated at 42, and they, of course, are also connected to the rear end frame member 43.

It will be seen that with the arrangement illustrated in Figs. 6 and 7 a very considerable amount of storage space is provided between the longitudinal members of the frame, and that the running boards 33, 33 may be utilized as steps, more especially at and toward the forward ends thereof. The precise location of the outside frame members with respect to the outer edges of the running boards is a matter of choice. As shown, such members, more especially at the rearward ends, are arranged quite close to the outer edges of the running boards, but they may be further out or further in than as shown, if desired, and with a frame so constructed cross frame members as 44 and 45 may be considerably shorter than in usual practice.

The frame of Figs. 12 and 13 is much like that of Figs. 6 and 7, except that the former is arranged for the use of springs extending longitudinally rather than transversely, as in the case of Figs. 6 and 7. The inner frame members 50, 50 and the outer frame members 51, 51 are brought together at their rear ends to form horns 52, 52, suitably strengthened and reinforced for the attachment of springs, such as semi-elliptic rear springs 53, and when the forward end of the rear spring is attached to the under side of the frame structure, provision may be made for the reception of suitable spring fastening means, such as spring bolts and the like, by the provision of reinforcing cross members, such as 54, 54, to assist in securing and supporting the spring fastening member in place on the frame. In all other respects save those just referred to, the frame members of Figs. 12 and 13 are substantially identical to those of Figs. 6 and 7.

In Fig. 14 a modification is illustrated, in which the inner frame member 50' and the outer frame member 51' are not brought together to form horns for receiving the front springs, but the outer frame member 55, which serves to reinforce the inner frame member 50' at the forward end thereof, is turned outwardly and provided with a flange 56 which is curved to conform to and fit the upwardly curved forward end 57 of the running board member 58, and the outer frame member 51' is provided with an inwardly projecting flange 59, also curved to conform to and fit against the curved end of the running board member 58 on its opposite side, and the same are secured together in a three-thickness connection, as by means of a row of rivets 60, 60, a second row of rivets 61, 61 serving to rivet the flange 56 to the running board member 58, and a third row of rivets 62, 62 serving to separately connect the flange on the outer frame member 51′ to the running board. Also the outer frame member 51′ is shown extending out to the outer edge of the running board and flush therewith, and with such arrangement it is obviously impossible to utilize the running board as a step.

With such arrangement, or with other arrangements where occasion therefor may arise, I may provide a step which is normally withdrawn and out of sight beneath the running board, but which is exposed for use by opening the door and again withdrawn when the door is closed. Such step is illustrated at 63 in Fig. 15 and may have the form of a flat plate of metal, such as steel, and may be received in a slot 64 in the flange 65 of the running board member and pivoted thereto, as indicated at 66, and the door 67 (Figs 15 and 16) may be connected up to rotate said hinge so as to project it for use when the door is opened and to withdraw it when the door is closed. In the form shown a shaft 68 rotates with the door and carries an arm 69 to which a link 70 is pivoted, and said link is also pivoted at 71 to the step 63. When the door is opened, as illustrated in dotted lines in Fig. 15, the step 63 will be projected outwardly for use, and when the door is closed the step 63 will be drawn into the dotted line position shown in Fig. 15. Means are preferably provided for holding the step against rattling and for holding it, to at least some extent, in either outwardly projected or closed position. In the form shown the step 63 is provided with notches 63′, 63′, and a lever 72, pivoted beneath the running board at 73, is drawn by a spring 74 against the edge of the step 63 and is provided with a pointed portion 75 which is adapted to enter the notches 63′, 63′ and at least partially hold the step 63 in either of the two positions referred to. Such holding effect is sufficient to prevent accidental movement of the step 63, but is not sufficient to substantially interfere with the operation thereof by opening and closing of the door 67.

The storage space provided within the frame member may be covered over in any suitable way, as, for example, when the car body extends to the dotted lines 76 of Fig. 15, provision may be made in the construction of the car body and its floor for suitably covering or exposing such storage space. When the frame is constructed as in Figs. 14 and 15, a portion of the storage space will usually project beyond the car body, particularly at the front end thereof, and provision may be made for giving access thereto, as, for example, a door 77 may be provided for this purpose. Such storage space is a convenient place for the reception of tools and the like used for working on the engine, as it is conveniently located at hand to a person working at the side of the car on the engine or other parts.

In Fig. 18 and following still another form of frame is illustrated, and in this case the inner frame members 80, 80 extend outwardly at each end of the frame and are telescoped with the outer frame members (substantially as shown in Fig. 11) to form rearwardly and forwardly projecting horns for the attachment of longitudinally arranged springs. The outer frame members are made up of separate parts, as hereinafter referred to. The forward part 81 is illustrated in perspective in Fig. 22, and when assembled fits over the forward end of the frame member 80 to reinforce the same, and also is provided with an outwardly projecting curved flange 82. The outer rearward frame member is shown in perspective in Fig. 21 and is numbered 83, and it fits over and reinforces the rear end of the frame member 80 and is provided with an outwardly projecting curved portion 84. The part 85, shown in perspective in Fig. 23, may be referred to as a running board member, although in the present instance it does not serve the usual functions of a running board, as it is not arranged to be used as a step. It has forwardly curved upward and rear curved portions 86, 86 and inner flanges 87, 87 adapted to be secured, as by riveting, to the frame members 80, 80 on the outside thereof. As will be noted, these flanges 87, 87 do not extend the length of the running board member 85, but only for the length of the curved end portions 86, 86 thereof, and the inwardly projecting portion 88 of the running board member 85 extends inwardly beneath the member 80 and is secured thereto, as by riveting, as shown in Fig. 25. In assembly of the parts it should be noted that the member 85 is preferably attached, as by riveting, to the member 80 prior to the securing in place thereon of the end portions 81 and 83. The running board member 85 also has flanges 89, 89 on its outer sides, also extending preferably only for the length of the curved portions 86, 86 thereof, although, if desired, such flanges may be continued along the entire outer edge of the running board, as, for example, in the case of the running board shown in Figs. 1 and 2. It will be seen that when these parts are secured together with the curved portions 82 and 84 conforming to the curves 86, 86 of the running board member 85, the flanges 89, 89 project forwardly and rearwardly beyond such members 82 and 84 and are adapted to form the lower portions of mud guards. It should also be noted that, while the parts 81, 83 and 85 are shown and have been described as three separate pieces, they may be formed integrally, if desired, but preferably they are made in separate pieces in order to simplify the construction of dies in the operation of making. To complete the frame member on each side of the machine a member 90, illustrated in perspective in Fig. 24, is used. Such member comprises a side or girder portion 91 having a flange 92 about the lower edge and ends thereof and adapted to fit within the member 85 at or near the forward edge thereof. Such member 90 also preferably comprises an integral top wall 93 which may be provided with openings, as 94, 94, for giving access to the interior of the hollow frame member when completed or during its construction. It will be seen that when the girder portion 91 of the member 90 is secured in place, as by riveting through the flange 92 to secure it to the other parts of the frame, a very strong and rigid construction is obtained, particularly at the ends thereof where the rivets securing the parts together fasten three parts, namely, the flange 92, the curved portion 86 of the running board member 85 and the outwardly projecting curved portions 82 and 84, respectively, and the rivets are not exposed to view but are either hidden by the flanges 89, 89 or else the rivet heads are under the frame where they are not exposed to view, and the top plate 93 being made integral with the girder member 91, there is no joint and no exposure of rivet heads or other connecting means at the outer upper corners.

Sufficient strength is ordinarily obtainable by constructing the frame of the form shown in Figs. 18–25, as already described, but additional strength and rigidity may be obtained, and at the same time the use of somewhat thinner metal is possible, by the provision of strengthening and reinforcing means such as shown in Fig. 25. The longitudinal frame members of an automobile frame are necessarily connected at one or more places in their length to provide cross members on which to support various parts and mechanisms, and, if desired, at or near such point or points means may be provided for forming substantially a continuation of such interior cross members for transversely strengthening and stiffening the outwardly projecting portions of the frame members provided in accordance with the present invention. In Fig. 18 two such cross frame members 95, 95 are shown, and within the inclosure formed by the frame members and substantially in continuation of the cross members 95, 95, strengthening and stiffening means may be provided, as, for example, I have shown, in Fig. 25, a member 96 formed by cutting a hole 97 in a plate of sheet metal or the like and outwardly flanging it, as at 98, and riveting such flange 98, as by rivets 99, through the frame member 80 and the flange 100 on the end of the cross member 95. Such arrangement provides substantially a girder whose length is substantially the width of the car frame, and which materially strengthens and stiffens the frame, particularly against such stresses as would be applied by a person jumping on top of the frame member at one side of the car. The top frame member 93 may be provided with depressions about the openings 94, 94, as indicated at 101, adapted for the reception of cover plates, as 102, and some of these may be inside the car body, having an outline, for example, as illustrated in the dotted lines 103, 103, Fig. 18, and others thereof may be outside of the car body, and I have illustrated covers 104, 104 at the forward end of the member 93 for covering storage spaces exposed for access to the interior of the car body. It will be understood that, if desired, a step such as shown, for example, in Fig. 15, may be provided with the frame of Figs. 18 and 19, but preferably the frame is built to come comparatively close to the ground and is itself of comparatively small height, which is readily possible by reason of the provision of two substantially parallel girders on each side of the frame, so that it will be readily possible to step immediately to the top of the frame, where the bottoms of the body door or doors may be placed, as, for example, the lowest portion of the frame, which consists of the running board member 85, may be spaced, say, about 12 inches above the ground, and with a frame height of about 8 inches for the member 91, the total height required to step on the top of the frame does not exceed 20 inches, and it is easy for the ordinary person to step to this height in entering the car, particularly with the assistance given by grasping the car body, and, of course, where the person entering the car steps into it from the height of the curb, it is a matter of ease to step directly upon the top 93 of the member 90. It will be understood, of course, that the rear portion of the frame shown in Figs. 18–25 may be substantially like the rear portion of the frame shown in Fig. 6, for example, in which case the members 80, 80 may run substantially straight back to the rear end of the frame as in said Fig. 6, the members 83, 83 taking the places of the members 36, 36 of Fig. 6, such variations depending principally upon the type of rear spring it is desired to use.

Frames for automobiles embodying the present invention afford a variety of advantages. The saving in space made available for storage is very considerable, and such storage space is low down so that the center of gravity of the car is lowered by the carrying of objects therein; the body may be of the full width flush to the edges of the running board, or of less width, as desired, and may be made much more roomy than with bodies adapted to be put on frames of types now ordinarily in use; the cross members for supporting engines, transmissions and other parts are greatly reduced in length and therefore in the necessary weight thereof required to support the parts to be borne thereby; the construction may be made extremely strong, and the use of aprons and other thin sheet metal parts, which readily get loose and rattle, is practically done away with, and still other advantages may be secured.

It is to be understood that modifications in and departures from the forms shown for the purpose of illustrating my invention may be made within the scope of my claims, without departing from my invention.

I claim:

1. An automobile frame having a side member formed in two parts laterally separated intermediate the end portion thereof and forming a storage compartment therebetween within the side member of the frame.

2. An automobile frame the longitudinal frame members whereof are constructed in two parts providing storage spaces therebetween behind the front wheel space and in front of the rear wheel space.

3. In an automobile frame, longitudinally extending side members, each constructed of two subtantially parallel U-bars, and a bottom member between the U-bars to provide storage space within the side members of the frame.

4. An automobile frame having its side members formed in two parts which are connected together at the ends and are spaced apart intermediate the ends, and storage space provided in such spaced apart portions.

5. In an automobile frame, side frame members constructed in two parts, said parts being brought together at their ends and separated intermediate their ends, and means for inclosing the space between the frame members for providing storage and carrying compartments.

6. In an automobile frame, a side frame member, a running board, said running board extending inward past the frame member, and means for inclosing the space over the running board and inside the frame member for providing a storage compartment.

7. In an automobile frame, a pair of inner longitudinally arranged frame members, a pair of outer longitudinally arranged frame members, said members being spaced apart intermediate their ends, and running board members extending inwardly past the outer frame members and secured to the inner frame members and forming bottom closures for storage compartments formed between the inner and outer frame members.

8. In an automobile frame, a pair of inner frame members running longitudinally thereof, a pair of outer frame members also running longitudinally thereof and serving to reinforce said inner frame members, said inner and outer frame members being spaced apart, and means secured to said frame members on the under side thereof and serving therewith to inclose storage compartments between them.

9. In an automobile frame, a longitudinally arranged frame member, a curved running board member secured directly thereto and extending outwardly therefrom, a second frame member having a flange fitting within the curve of the running board extension, reinforcing front and rear frame members having flanges fitting on the outside of the curve of the running board, and means for securing said frame members together with the curved portion of the running board therebetween.

In testimony that I claim the foregoing, I hereto set my hand, this 31st day of May, 1918.

HERBERT H. DYKE.